(12) United States Patent
Downs et al.

(10) Patent No.: US 9,649,882 B2
(45) Date of Patent: May 16, 2017

(54) AXLE ASSEMBLY WITH OUTBOARD AXLE BEARINGS

(71) Applicant: American Axle & Manufacturing, Inc., Detroit, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 209 days.

(21) Appl. No.: 14/663,479

(22) Filed: Mar. 20, 2015

(65) Prior Publication Data

US 2016/0272003 A1 Sep. 22, 2016

(51) Int. Cl.
| | |
|---|---|
| *B60B 35/18* | (2006.01) |
| *B60B 35/16* | (2006.01) |
| *B60B 35/12* | (2006.01) |
| *G01P 3/44* | (2006.01) |
| *G01P 3/487* | (2006.01) |

(52) U.S. Cl.
CPC ............ *B60B 35/18* (2013.01); *B60B 35/125* (2013.01); *B60B 35/16* (2013.01); *G01P 3/443* (2013.01); *G01P 3/487* (2013.01); *B60B 2320/10* (2013.01); *B60B 2380/90* (2013.01); *B60B 2900/113* (2013.01)

(58) Field of Classification Search
CPC ............... B60B 35/18; B60B 2380/90; B60B 2900/113; B60B 2320/10; B60B 35/16
See application file for complete search history.

(56) References Cited

U.S. PATENT DOCUMENTS

| | | | | |
|---|---|---|---|---|
| 1,422,647 | A * | 7/1922 | Zimmerman | ........... B60B 35/18 74/390 |
| 1,766,922 | A * | 6/1930 | Moorhouse | ............. B60B 35/18 180/339 |
| 2,158,235 | A * | 5/1939 | Griswold | ................ B60B 35/18 384/539 |
| 2,533,093 | A * | 12/1950 | Clark | ...................... F16D 55/32 188/370 |
| 6,553,865 | B1 | 4/2003 | Endreszl | |
| 6,957,918 | B2 * | 10/2005 | Beutler | ................ B60B 35/121 384/448 |
| 7,233,138 | B2 | 6/2007 | Michalek et al. | |
| 7,448,067 | B2 | 11/2008 | Yadav | |
| 8,092,132 | B2 | 1/2012 | Zink et al. | |
| 8,711,393 | B2 | 4/2014 | Fukano et al. | |
| 2014/0302961 | A1 | 10/2014 | Downs et al. | |
| 2015/0033909 | A1 | 2/2015 | Campbell | |

* cited by examiner

*Primary Examiner* — Sherry Estremsky
(74) *Attorney, Agent, or Firm* — Harness, Dickey & Pierce, P.L.C.

(57) ABSTRACT

An axle assembly having an axle housing, a wheel end cover and an axle shaft. The axle housing has a tubular member with an end flange coupled thereto. A pair of axle bearings are mounted to the axle shaft and the end flange and support the axle shaft for rotation relative to the axle housing. The wheel end cover is mounted to the end flange and carries a seal that is engaged to the axle shaft. A method for assembling an axle assembly is also provided.

19 Claims, 5 Drawing Sheets

AXLE ASSEMBLY WITH OUTBOARD AXLE BEARINGS

FIELD

The present disclosure relates to an axle assembly with outboard axle bearings.

BACKGROUND

This section provides background information related to the present disclosure which is not necessarily prior art.

U.S. Patent Publication No. 2014/0302961 discloses an axle assembly having a bearing that directly supports a ring gear for rotation relative to an axle housing. A differential case that is mounted in the axle housing is driven by the ring gear and outputs rotary power to a pair of axle shafts. The axle shafts are supported on their inboard ends by bearings. While such configuration is suited for its intended purposes, there remains a need in the art for a similar type of axle assembly that packages the bearings for the axle shaft in a manner that is easier to assemble.

SUMMARY

This section provides a general summary of the disclosure, and is not a comprehensive disclosure of its full scope or all of its features.

In one form, the present teachings provide an axle assembly that includes an axle housing, an axle shaft, a dust shield mount, a wheel end cover, a seal and first and second axle shaft bearings. The axle housing has a tubular member and an end flange that is fixedly coupled to the tubular member. The end flange defines a central body and a first flange that extends radially outwardly from the central body. The central body defines a through bore, a first flange mount and an outer seal surface. The through bore has first and second bearing bore portions. The first flange mount has a first annular shoulder. The axle shaft defines an inner seal surface, a first bearing mount and a second bearing mount. The dust shield mount is abutted to the first annular shoulder on the first flange mount. The wheel end cover has an annular body and a second flange that extends radially outwardly from the annular body. The second flange abuts the dust shield mount on a side of the dust shield mount opposite the first shoulder. The annular body is engaged to the outer seal surface of the central body. The seal is mounted to the annular body of the wheel end cover and sealingly engages the inner seal surface of the axle shaft. The first axle bearing is located on the first bearing mount and the first bearing bore portion. The second axle bearing is located on the second bearing mount and the second bearing bore portion. The first and second axle bearings support the axle shaft for rotation relative to the axle housing.

In another form, the present teachings provide a method for assembling an axle assembly. The method includes: providing a tubular member; coupling a tube end connector to the tubular member; installing a radial seal to a wheel end cover; installing the wheel end cover to an axle shaft such that the radial seal sealingly engages an inner seal surface formed on the axle shaft; installing first and second axle bearings onto the axle shaft; mounting a dust shield mount to a first annular shoulder formed on the tube end connector; and installing the axle shaft through the tube end connector and the tubular member such that the first and second axle bearings are seated into the tube end connector and a flange on the dust shield abuts flanges formed on the wheel end cover and the tube end connector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
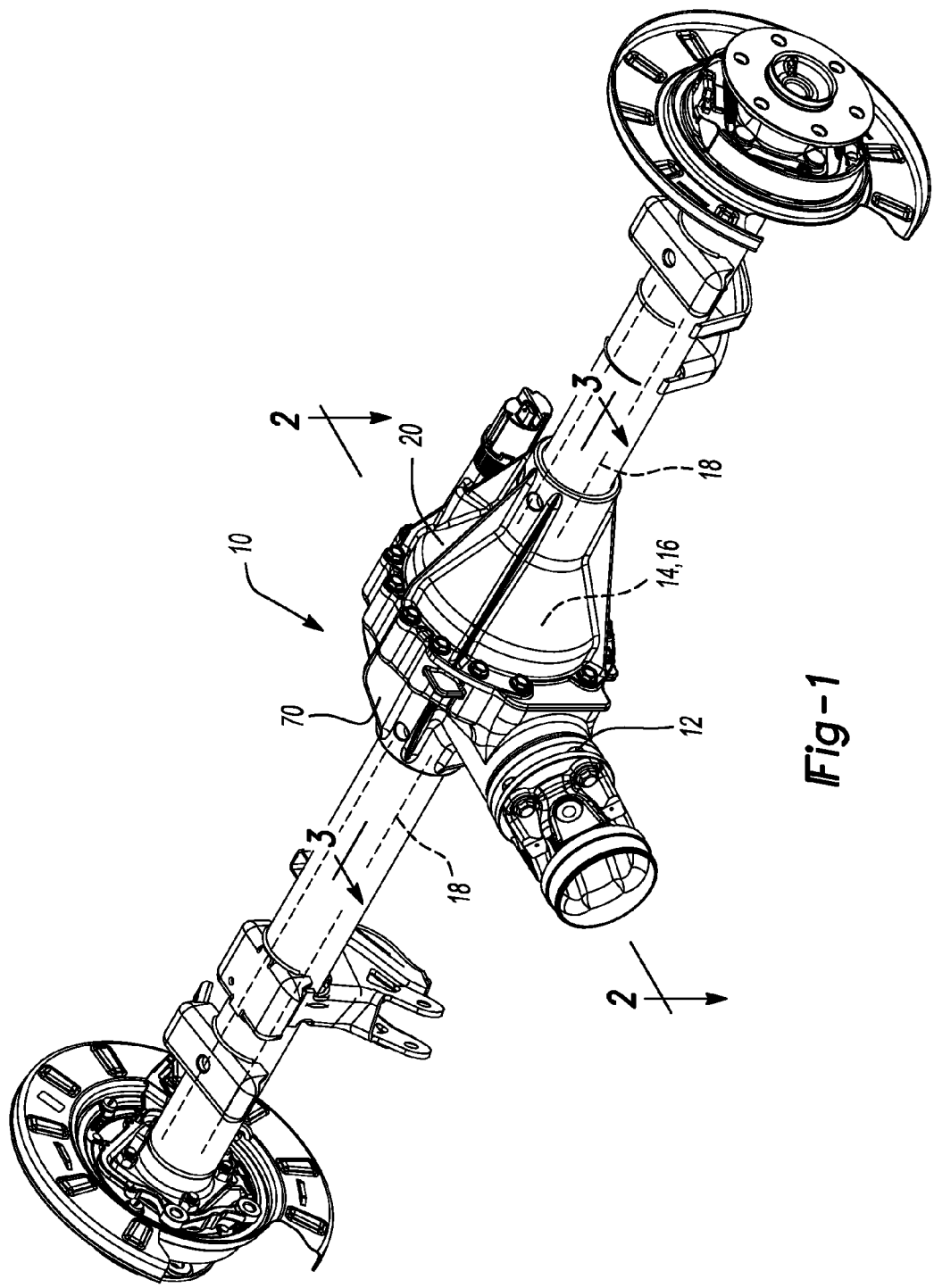
FIG. 1 is a perspective view of an exemplary axle assembly constructed in accordance with the teachings of the present disclosure.
Figure 2:
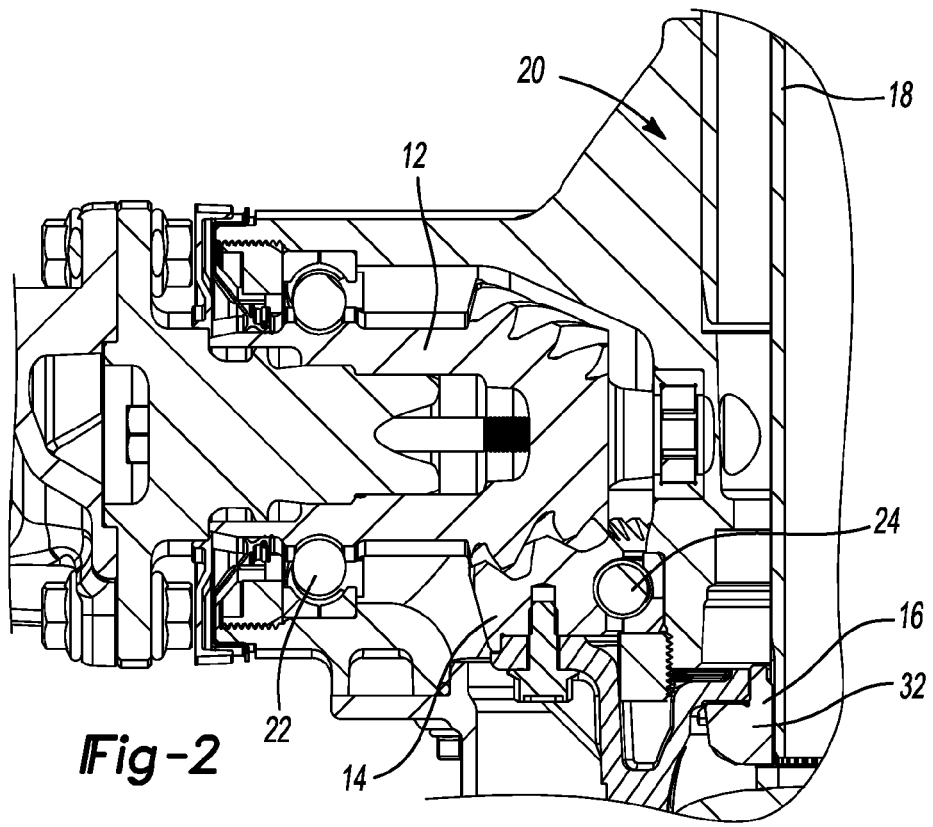
FIG. 2 is a section view taken along the line 2-2 of FIG. 1.
Figure 3:
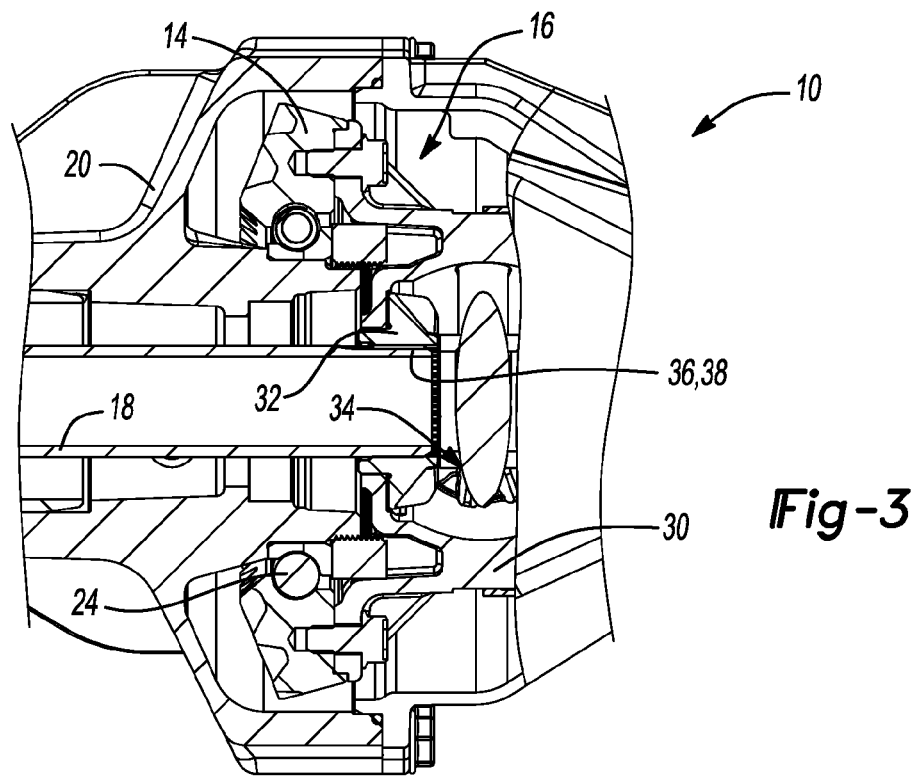
FIG. 3 is a section view taken along the line 3-3 of FIG. 1.

With reference to FIGS. 1 through 3, an exemplary axle assembly constructed in accordance with the teachings of the present disclosure is generally indicated at reference numeral 10. The axle assembly 10 can include an input pinion 12, a ring gear 14, a differential assembly 16, a pair of axle shafts 18 and a housing assembly 20. The input pinion 12 and the ring gear 14 can be housed in the housing assembly 20 in a manner that is described in detail in commonly assigned, co-pending U.S. application Ser. No. 14/205,535 entitled "Axle Assembly", the disclosure of which is incorporated by reference as if fully set forth in detail herein. Briefly, each of the input pinion 12 and the ring gear 14 can be supported for rotation about a respective axis via an angular contact bearing, such as by four-point angular contact bearings 22 and 24, respectively. The input pinion 12 can be meshingly engaged to the ring gear 14 to transmit rotary power there between.

With reference to FIG. 3, the differential assembly 16 can be received in the housing assembly 20 and can include a differential case 30 that can be coupled to the ring gear 14 for common rotation. The differential assembly 16 can have a pair of differential outputs 32 (only one shown), such as the side gears of a differential gearset 34, that can be coupled to a corresponding one of the axle shafts 18 for common rotation. For example, the differential outputs 32 can have a splined aperture 36 into which a splined end 38 of the axle shaft 18 can be received. If desired, the differential case 30 need not be directly supported on the housing assembly 20 by a bearing or other structure for rotation about its axis. It will be appreciated that the axle assembly 10 does not have bearings that are located directly between the housing assembly 20 and the differential case 30 to support the differential case for rotation within the housing assembly 20. Moreover, the axle assembly 10 does not have bearings located deeply inside the housing assembly 20 that support the axle shafts 18 at a location that is proximate the differential assembly 16.

Figure 4:
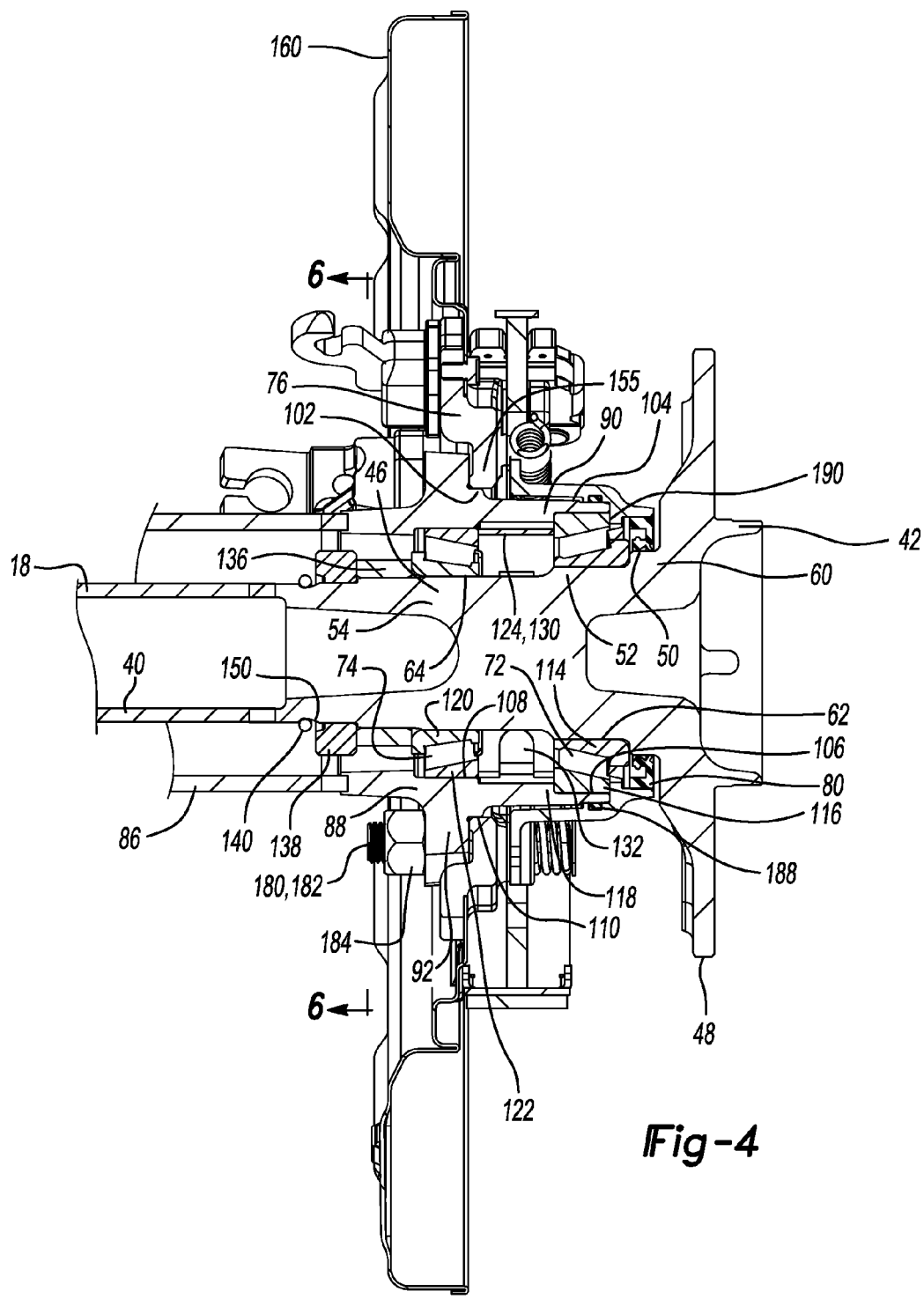
FIG. 4 is a section view taken along the line 4-4 of FIG. 1.

With reference to FIG. 4, each of the axle shafts 18 can comprise a shaft portion 40 and a wheel hub portion 42 that can be fixedly coupled to the shaft portion 40 for common rotation. In the example provided, the shaft portion 40 comprises a tubular shaft segment, the wheel hub portion 42 is a forging, and the wheel hub portion 42 is friction welded to the shaft portion 40. It will be appreciated, however, that the axle shafts 18 could be constructed differently. The wheel hub portion 42 can have a shaft section 46, which can be fixedly coupled to the shaft portion 40, and a wheel flange 48 that can be coupled to the shaft section 46 on a side opposite the shaft portion 40. The shaft section 46 that can define an inner seal surface 50, a first bearing mount 52 and a second bearing mount 54. The inner seal surface 50 can be disposed axially between the wheel flange 48 and the first bearing mount 52 and can be formed on a first shoulder 60. The first bearing mount 52 can be formed on a second shoulder 62 that can be spaced axially between the inner seal surface 50 and the second bearing mount 54. The second bearing mount 54 can be formed on a third shoulder 64. The second shoulder 62 can be smaller in diameter than the first shoulder 60, and the third shoulder 64 can be smaller in diameter than the second shoulder 62.

Figure 5:
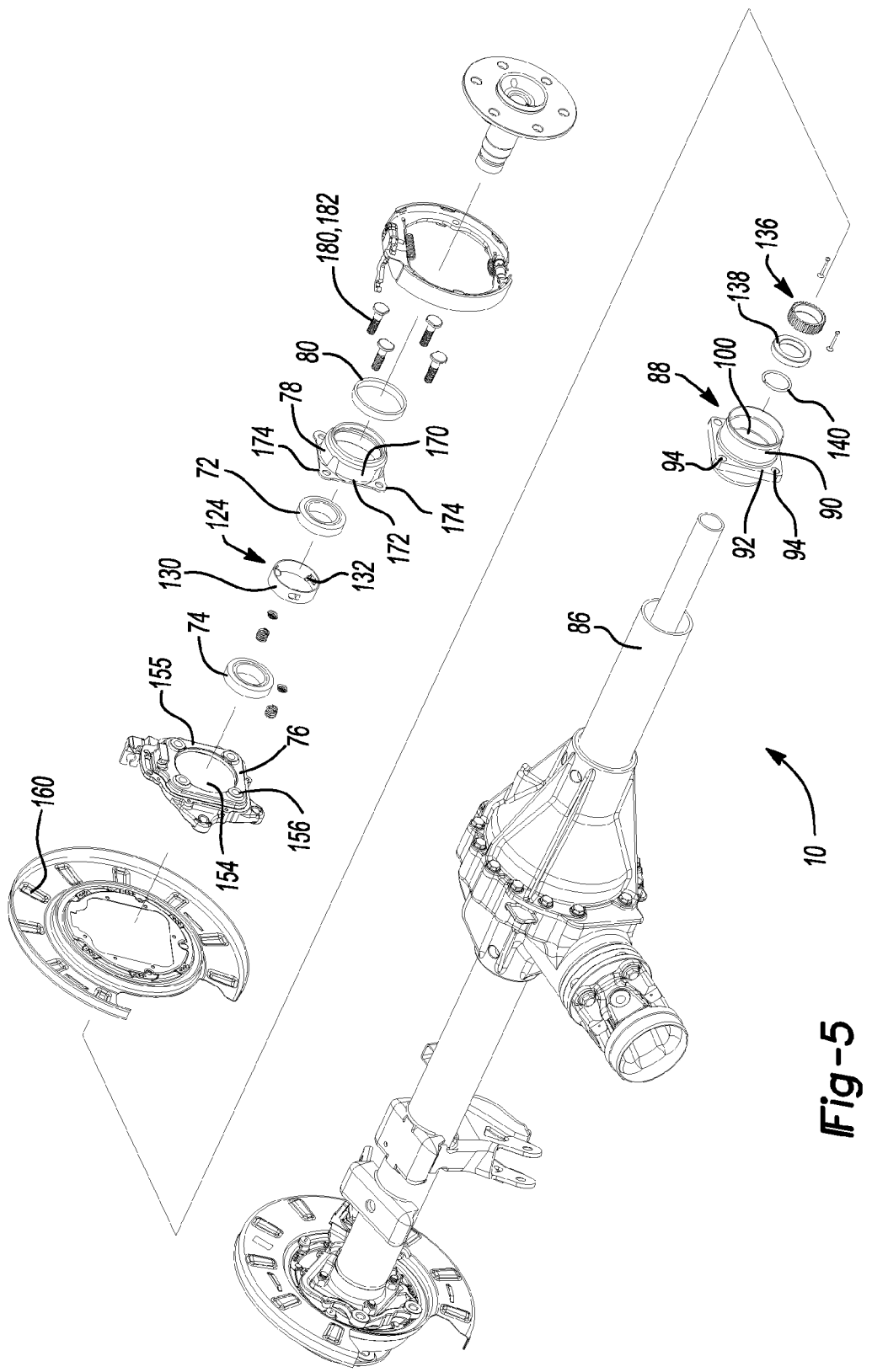
FIG. 5 is a perspective, partly exploded view of the axle assembly of FIG. 1.

With reference to FIG. 5, the housing assembly 20 can comprise an axle housing 70, a pair of first axle bearings 72, a pair of second axle bearings 74, a pair of dust shield mounts 76, a pair of wheel end covers 78 and a pair of seals 80. The axle housing 70 can have a pair of tubular members 86 and a pair of end flanges 88.

With reference to FIGS. 4 and 5, each end flange 88 can be fixedly coupled to one of the tubular members 86 in any desired manner. For example, the end flanges 88 are friction welded to the tubular members 86 in the example provided. It will be appreciated, however, that the end flanges 88 could be unitarily and integrally formed with the tubular members 86, or that any type of coupling means, including welds, adhesives and/or fasteners could be used to couple the end flanges 88 to the tubular members 86. Each of the end flanges 88 can define a hollow central body 90 and a first flange 92 that can extend radially outwardly from the hollow central body 90 and define a plurality of first bolt bosses 94. The hollow central body 90 can define a through bore 100, a first flange mount 102 and an outer surface 104. The through bore 100 can have first and second bearing bore portions 106 and 108, respectively. The first flange mount 102 can have a first annular shoulder 110 and can abut the first flange 92.

Figure 6:
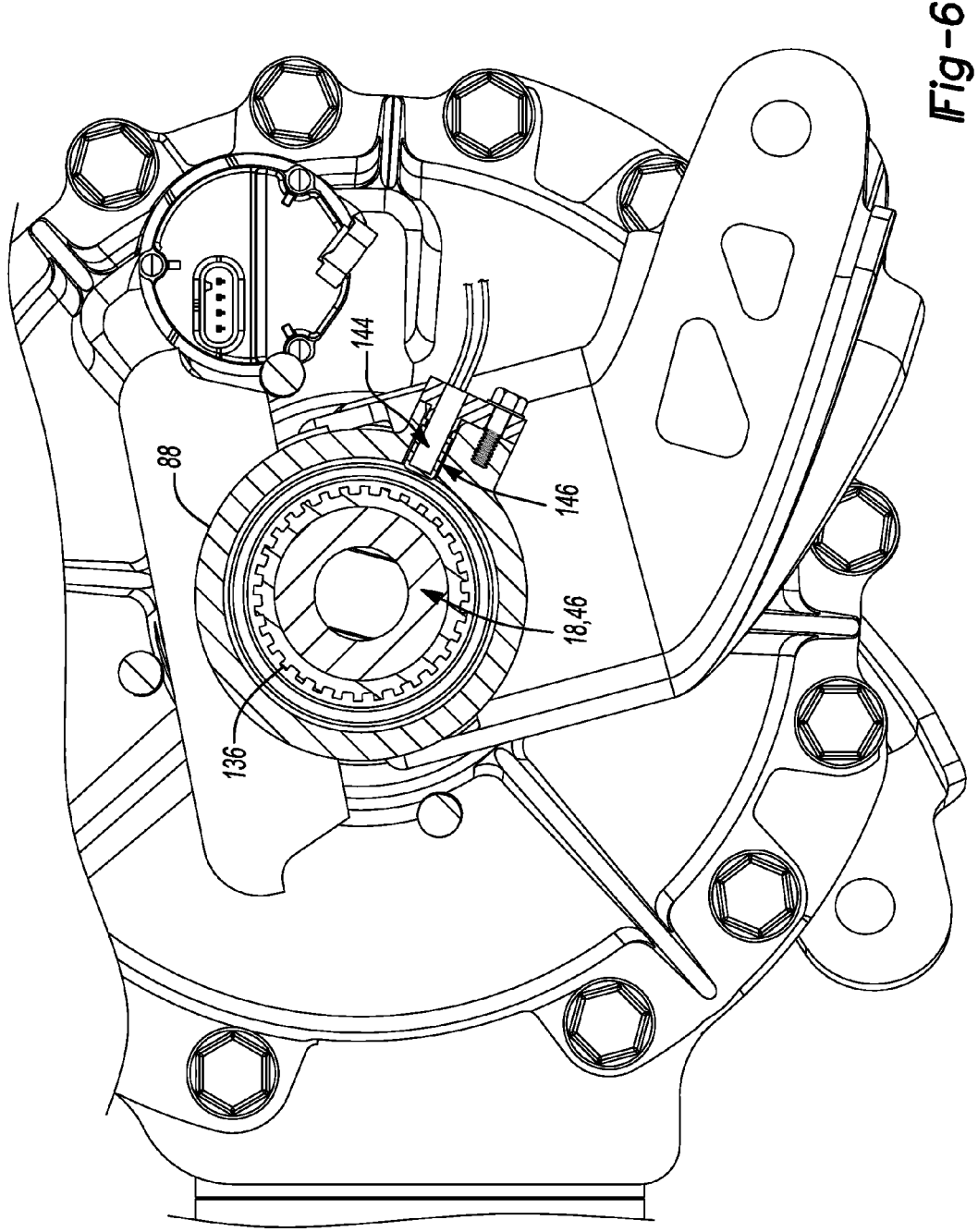
FIG. 6 is a section view taken along the line 6-6 of FIG. 4.

Each of the first axle bearings 72 can be received on the second shoulder 62 of the first bearing mount 52 on a corresponding one of the axle shafts 18 and can be received in the first bearing bore portion 106 of the through bore 100 in a corresponding one of the end flanges 88. The first axle bearings 72 can have an inner bearing race 114, which can be abutted against the first shoulder 60 on the axle shafts 18, and an outer bearing race 116 that can be abutted against a shoulder 118 formed on the end flanges 88. Each of the second axle bearings 74 can be received on the third shoulder 64 of the second bearing mount 54 on a corresponding one of the axle shafts 18 and can be received in the second bearing bore portion 108 of the through bore 100 in a corresponding one of the end flanges 88. The second axle bearings 74 can have an inner bearing race 120 and an outer bearing race 122. A spacer 124 can be received between the outer bearing race 116 of the first axle bearing 72 and the outer bearing race 122 of the second axle bearing 74. The spacer 124 can be configured to transmit load between the outer bearing races 116 and 122 when the first and second axle bearings 72 and 74 are preloaded in the process of assembling the axle assembly 10. The spacer 124 can comprise a hollow cylindrical body 130 and optionally can include a plurality of radial tabs 132 that can extend radially inwardly from the hollow cylindrical body 130 and can touch the outer surface of the axle shaft 18 to center the spacer 124 on the axle shaft 18. A tone wheel 136, a wedding band 138 and a retaining ring 140 can be coupled to each axle shaft 18 and configured to aid in preloading the first and second axle bearings 72 and 74. The tone wheel 136 can be the target of a sensor 144 (FIG. 6) that is configured to sense the rotation of the tone wheel 136 and responsively generate a sensor signal that is indicative of a rotational speed of the axle shaft 18. In the particular example provided, the sensor 144 (FIG. 6) is a Hall-effect sensor and the tone wheel 136 is an annular structure having a plurality of teeth formed on its outer perimeter that are sensed by the sensor 144 as the tone wheel 136 rotates with the axle shaft 18. The tone wheel 136 can be non-rotatably coupled to the axle shaft 18 in any desired manner, such as press-fit onto the shaft section 46. The tone wheel 136 can be abutted against the inner bearing race 120 of the second axle bearing 74. The sensor 144 can be received through a sensor aperture 146 formed in the end flange 88 and can be positioned proximate the tone wheel 136. The wedding band 138 can be an annular structure that can be press-fit to the axle shaft 18 and abutted against the tone wheel 136. The retaining ring 140 can be mounted to a groove 150 formed in the axle shaft 18 and can limit movement of the wedding band 138 in a direction away from the second axle bearing 74.

Each dust shield mount 76 can be a flange-like structure having a bore 154 formed there through that is configured to be received onto the first annular shoulder 110 that is formed on a corresponding one of the end flanges 88. Each dust shield mount 76 can define a flange 155 having a plurality of second bolt bosses 156 that can be aligned to the first bolt bosses 94 on the first flange 92 of a corresponding one of the end flanges 88. The dust shield mounts 76 are configured to mount a dust shield 160 to a corresponding one of the end flanges 88. In the particular example provided, the dust shields 160 and the dust shield mounts 76 are formed as discrete components that are assembled together to provide modularity in the design that permits the use of several differently sized dust shields to be mounted to a common axle housing 70. It will be appreciated, however, that the dust shields 160 could be unitarily and integrally formed with the dust shield mounts 76.

Each of the wheel end covers 78 be coupled to a corresponding one of the end flanges 88. Each of the wheel end covers 78 can have an annular body 170 and a second flange 172 that can extend radially outwardly from the annular body 170. The second flange 172 can define a plurality of third bolt bosses 174 that can be aligned to the first and second bolt bosses 94 and 156. Threaded fasteners 180 can be received through the first, second and third bolt bosses 94, 156 and 174 and can exert a clamping force that couples the second flange 172, the dust shield mount 76 and the first flange 92 together. In the particular example provided, the threaded fasteners comprise studs 182, which are press-fit into the third bolt bosses 174, and a plurality of nuts 184 that are engaged to the studs 182 on a side of the first flange 92 that is opposite the side to which the dust shield mount 76 is engaged. The annular body 170 can be slidably received over the hollow central body 90 of the end flange 88.

Optionally, the annular body 170 can carry a seal 188 that can be sealingly engaged to the outer surface 104 that is formed on the hollow central body 90. Also optionally, the annular body 170 can define an inwardly projecting rib 190 can be abutted against the outer bearing race 116 of the first axle shaft bearing 72. Placement of the inwardly projecting rib 190 axially in-line with the outer bearing race 116 of the first axle bearing 72 prevents the outer bearing race 116 from being withdrawn from the end flange 88 without removal of the wheel end cover 78 from the axle housing 70.

The seal 80 can be coupled to the wheel end cover 78 and can sealingly engage the inner seal surface 50 formed on the wheel hub portion 42 of the axle shaft 18. In the particular example provided, the seal 80 is a lip seal that is formed as a discrete component and assembled to the wheel end cover 78 so as to abut the inwardly projecting rib 190 on an axial side that is opposite the outer bearing race 116 of the first axle shaft bearing 72. Alternatively, the seal 80 could be molded onto (i.e., cohesively bonded to) the wheel end cover 78.

To assemble the axle assembly 10, the following assembly method may be utilized: providing a tubular member 86; coupling a tube end connector 88 to the tubular member 86; installing a radial seal 80 to a wheel end cover 78; installing the wheel end cover 78 to an axle shaft 18 such that the radial seal 80 sealingly engages an inner seal surface 50 formed on the axle shaft 18; installing first and second axle bearings 72 and 74 onto the axle shaft 18; mounting a dust shield mount 76 to a first annular shoulder 110 formed on the tube end connector 88; and installing the axle shaft 18 through the tube end connector 88 and the tubular member 86 such that the first and second axle bearings 72 and 74 are seated into the tube end connector 88 and the flange 155 on the dust shield mount 76 abuts flanges 172 and 92 formed on the wheel end cover 78 and the tube end connector 88.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
   an axle housing having a tubular member and an end flange that is fixedly coupled to the tubular member, the end flange defining a central body and a first flange that extends radially outwardly from the central body, the central body defining a through bore, a first flange mount and an outer seal surface, the through bore having first and second bearing bore portions, the first flange mount having a first annular shoulder;
   an axle shaft that defines an inner seal surface, a first bearing mount and a second bearing mount;
   a dust shield mount abutted to the first annular shoulder on the first flange mount;
   a wheel end cover having an annular body and a second flange that extends radially outwardly from the annular body, the second flange abutting the dust shield mount on a side of the dust shield mount opposite the first shoulder, the annular body being engaged to the outer seal surface of the central body;
   a seal that is mounted to the annular body of the wheel end cover and sealingly engages the inner seal surface of the axle shaft; and
   first and second axle bearings, the first axle bearing being located on the first bearing mount and the first bearing bore portion, the second axle bearing being located on the second bearing mount and the second bearing bore portion, the first and second axle bearings supporting the axle shaft for rotation relative to the axle housing.

2. The axle assembly of claim 1, wherein the seal is overmolded onto the wheel end cover.

3. The axle assembly of claim 1, wherein threaded fasteners couple the first flange, the dust shield mount and the second flange together.

4. The axle assembly of claim 3, wherein the threaded fasteners comprise studs that are fixedly coupled to the second flange.

5. The axle assembly of claim 1, further comprising a tone wheel fixedly mounted to the axle shaft.

6. The axle assembly of claim 5, further comprising a sensor that is configured to sense rotation of the tone wheel and responsively generate a signal, the sensor being mounted to the end flange.

7. The axle assembly of claim 1, wherein the wheel end cover extends axially in-line with an outer bearing race of the first axle bearing so that the outer bearing race cannot be withdrawn from the end flange without removing the wheel end cover from the axle housing.

8. The axle assembly of claim 1, wherein each of the first and second axle bearings has an outer bearing race and wherein the axle assembly further comprises a spacer that is disposed axially between the outer bearing races of the first and second axle bearings.

9. The axle assembly of claim 8, wherein the spacer comprises a plurality of radial tabs that contact the axle shaft.

10. The axle assembly of claim 1, further comprising a ring gear and a differential assembly, the ring gear being mounted in the axle housing via an angular contact bearing, the differential assembly having a differential case, which is non-rotatably coupled to the ring gear, and a pair of output members that are driven by the differential case, the axle shaft being non-rotatably coupled to a corresponding one of the output members, wherein the axle assembly does not have bearings directly between the axle housing and the differential case that support the differential case for rotation within the axle housing.

11. A method for assembling an axle assembly, the method comprising:
    providing a tubular member;
    coupling a tube end connector to the tubular member;
    installing a radial seal to a wheel end cover;
    installing the wheel end cover to an axle shaft such that the radial seal sealingly engages an inner seal surface formed on the axle shaft;
    installing first and second axle bearings onto the axle shaft;
    mounting a dust shield mount to a first annular shoulder formed on the tube end connector; and
    installing the axle shaft through the tube end connector and the tubular member such that the first and second axle bearings are seated into the tube end connector and a flange on the dust shield mount abuts flanges formed on the wheel end cover and the tube end connector.

12. The method of claim 11, wherein each of the first and second axle bearings comprises an outer bearing race and wherein installing the first and second axle bearings onto the axle shafts comprises installing a spacer axially between the outer bearing races of the first and second axle bearings.

13. The method of claim 12, wherein the spacer comprises an annular body, which is abutted against the outer bearing races, and a plurality of radially inwardly extending tabs that contact the axle shaft.

14. The method of claim 11, wherein prior to installing the axle shaft through the tube end connector and the tubular member, the method comprises coupling a tone wheel to the axle shaft for common rotation.

15. The method of claim 11, wherein coupling the tube end connector to the tubular member comprises friction welding the tube end connector to the tubular member.

16. The method of claim 11, wherein installing the axle shaft through the tube end connector and the tubular member includes coupling the axle shaft to an output member of a differential assembly for common rotation.

17. The method of claim 16, wherein the output member has a splined aperture into which a splined end of the axle shaft is received.

18. The method of claim 11, further comprising friction welding an axle shaft member to a wheel flange member to form the axle shaft.

19. The method of claim 18, wherein the axle shaft member is hollow.

* * * * *